(12) United States Patent
Schlipf et al.

(10) Patent No.: US 12,208,896 B2
(45) Date of Patent: Jan. 28, 2025

(54) WING FOR AN AIRCRAFT

(71) Applicant: Airbus Operations GmbH, Hamburg (DE)

(72) Inventors: Bernhard Schlipf, Hamburg (DE); Jan Haunert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/361,544

(22) Filed: Jul. 28, 2023

(65) Prior Publication Data
US 2024/0034458 A1    Feb. 1, 2024

(30) Foreign Application Priority Data

Jul. 29, 2022 (EP) ..................................... 22187881

(51) Int. Cl.
*B64C 13/50* (2006.01)
*B64C 9/18* (2006.01)

(52) U.S. Cl.
CPC ................ *B64C 9/18* (2013.01); *B64C 13/50* (2013.01)

(58) Field of Classification Search
CPC .... B64C 9/06; B64C 9/18; B64C 9/20; B64C 13/50
See application file for complete search history.

(56) References Cited

U.S. PATENT DOCUMENTS

| 2,379,274 | A | | 6/1945 | Boyd | |
|---|---|---|---|---|---|
| 4,702,442 | A | * | 10/1987 | Weiland | ..................... B64C 9/16 244/218 |
| 4,796,840 | A | | 1/1989 | Heynatz | |
| 11,505,304 | B2 | * | 11/2022 | Tsai | ............................ B64C 9/06 |
| 2022/0227480 | A1 | | 7/2022 | Westermeier et al. | |
| 2023/0312080 | A1 | * | 10/2023 | Schlipf | ...................... B64C 9/20 244/215 |

FOREIGN PATENT DOCUMENTS

| DE | 692059 C | | 6/1940 | |
|---|---|---|---|---|
| GB | 1368347 A | * | 9/1974 | ............... B64C 9/16 |

OTHER PUBLICATIONS

Extended European Search Report for EP22187881.2 mailed Jan. 30, 2023, 7 pages.

* cited by examiner

*Primary Examiner* — Brian M O'Hara
(74) *Attorney, Agent, or Firm* — Nixon & Vanderhye P.C.

(57) ABSTRACT

A wing (3) for an aircraft (1) including a main wing (5) and a trailing edge high lift assembly (9) movably arranged at a trailing edge of the main wing (5). The trailing edge high lift assembly (9) includes a flap (11) and a connection assembly (13) movably mounting the flap (11) to the main wing (5). The connection assembly (13) includes an actuator unit (35) moving the flap (11) between a retracted position and at least one extended position. The flap (11) includes a leading edge part (23) and a trailing edge part (27) mounted to the leading edge part (23) pivotable about a pivot axis (31).

17 Claims, 3 Drawing Sheets

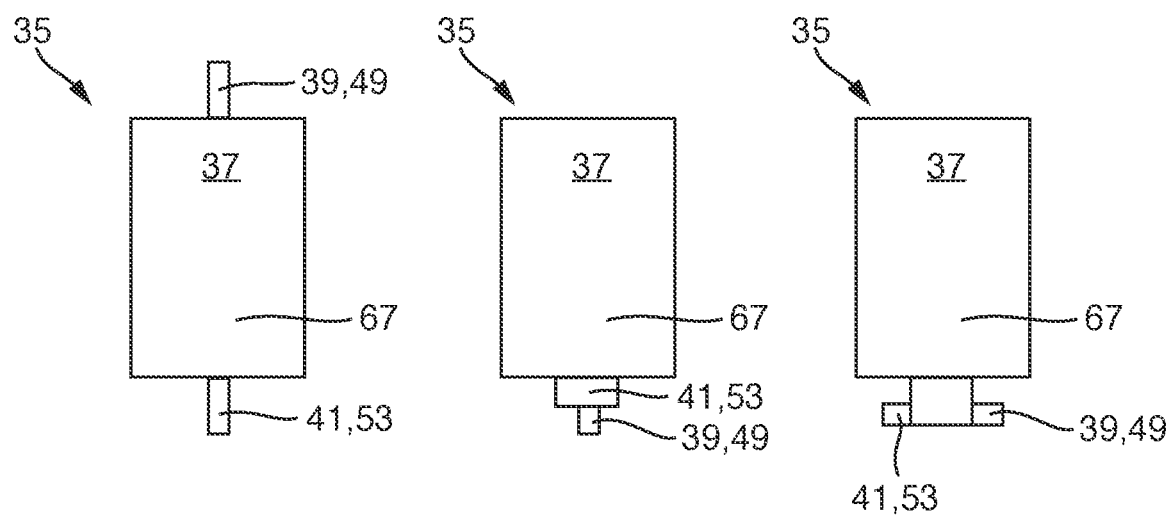
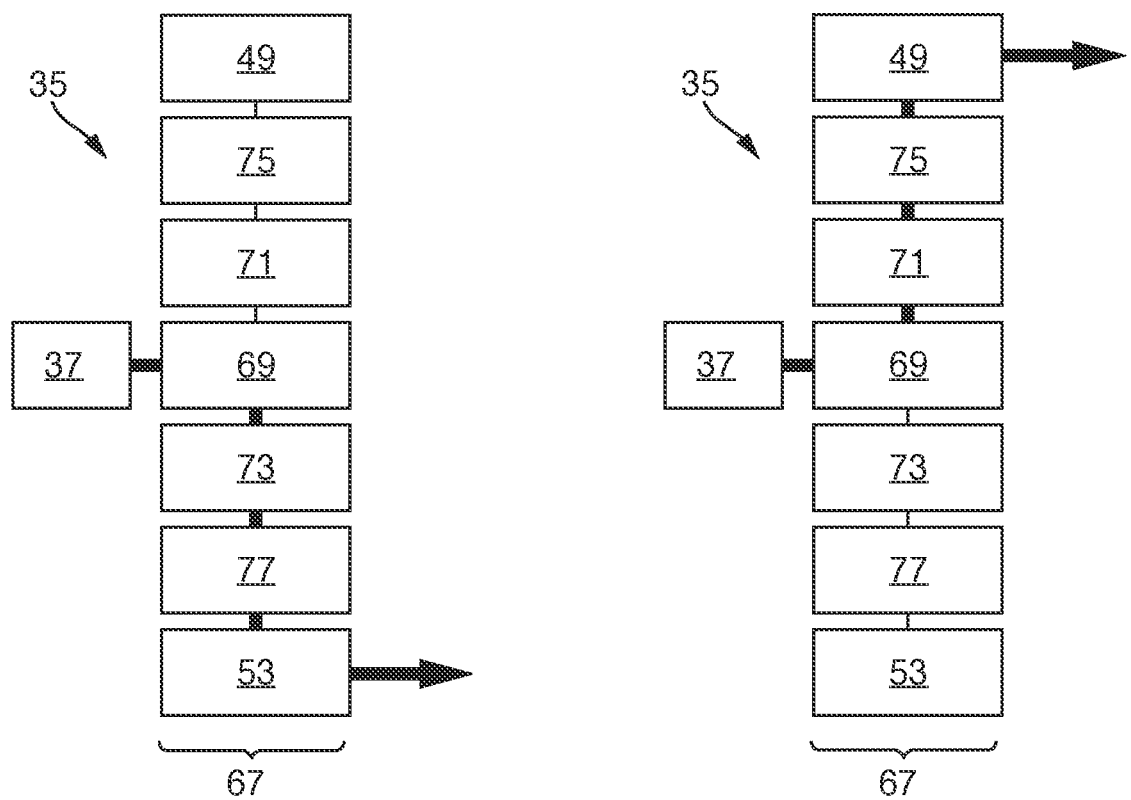

WING FOR AN AIRCRAFT

RELATED APPLICATION

This application incorporates by reference and claims priority to European Patent Application EP 22187881.2, filed Jul. 29, 2022.

TECHNICAL FIELD

The present invention relates to a wing for an aircraft. Further aspects of the invention relate to a trailing edge high lift assembly for such a wing, and to an aircraft comprising such a wing and/or comprising such a trailing edge high lift assembly.

BACKGROUND

The wing comprises a main wing and a trailing edge high lift assembly. The trailing edge high lift assembly is movably arranged at a trailing edge of the main wing and comprises a flap and a connection assembly. The connection assembly movably mounts the flap to the main wing, such that the flap is movable relative to the main wing between a retracted position with a reduced chord length and/or curvature of the wing, and at least one extended position with an extended chord length and/or curvature of the wing. The connection assembly comprises an actuator unit, e.g. including a rotary motor or a linear motor, for moving the flap between the retracted position and the at least one extended position. The flap comprises a leading edge part, in particular a main flap part, comprising the leading edge of the flap, and a trailing edge part, in particular a tab, comprising the trailing edge of the flap and mounted to the leading edge part, in particular to the trailing edge of the leading edge part, in a manner pivotable about a pivot axis that may extend in a span direction.

Similar wings are known in the art. Some known wings comprise a trailing edge high lift assembly having a flap that is movable relative to the main wing in a rotational manner, e.g. by the flap being fixedly mounted on a lever that is rotatably mounted to the trailing edge of the main wing and that is driven by a drive strut mounted to a rotating drive arm. Other known wings have a trailing edge high lift assembly with a flap that is movable relative to the main wing in a combined linear and rotational manner, e.g. by the flap being rotatably mounted on a carriage running along a linear guide rail while the flap is driven by a drive strut mounted to a rotating drive arm, so that the flap carries out a coupled linear and rotational motion. Such trailing edge high lift assemblies are designed to be deployed during take-off and landing of an aircraft to increase lift and reduce minimum air speed by increasing wing area, curvature, and angle of attack, and to be retracted during cruise flight when air speed is high to reduce drag.

More recent investigations have shown that it might be advantageous to have a morphing wing that might adjust wing area, curvature, and angle of attack during the entire flight, e.g. as a "real-time" response to gust or to optimize lift, drag and structural loading during the flight. This can be achieved by the two-part flap comprising leading edge part and trailing edge part which can be moved relative to one another as required.

For moving the trailing edge part relative to the leading edge part of the flap some known wings employ an additional actuator unit. Such an additional actuator unit, however, increases weight and costs of the wing.

The invention may be embodied as a wing having a simplified trailing edge high lift assembly that allows to reduce weight and costs of the wing.

The wing may include an actuator unit configured for moving the trailing edge part relative to the leading edge part in a way independent from moving the flap relative to the main wing between the retracted position and the at least one extended position. Additionally or alternatively, the actuator unit is configured for moving the flap relative to the main wing between the retracted position and the at least one extended position in a way independent from moving the trailing edge part relative to the leading edge part. The actuator unit may be configured for driving the trailing edge part relative to the leading edge part and the flap relative to the main wing between the retracted position and the at least one extended position, independently from one another. This might be realized by the actuator unit comprising two independently driven output shafts, one output shaft driving the trailing edge part relative to the leading edge part and another output shaft driving the flap relative to the main wing. In such a way, only one actuator unit, such as only one motor, is required to move both the flap relative to the main wing and the trailing edge part relative to the leading edge part of the flap in an independent manner, thereby largely reducing complexity, weight and costs of the wing.

According to an embodiment, the connection assembly is configured such that the flap is movable relative to the main wing in a rotational manner, i.e. in a pivoting manner. The flap may be mounted to the main wing in a manner rotatable about a flap rotation axis. The flap rotation axis may be located outside the profile of the flap, and spaced apart from the flap, e.g. by a flap lever arm. The flap lever arm may be mounted to the main wing via a rib that projects downwards from the lower side of the main wing and that is mounted to the lever arm rotatably via the flap rotation axis. Such a rotationally mounted flap relates to a very simple and reliable connection assembly and trailing edge high lift assembly design. However, other flap mountings are also possible, in particular flap mountings allowing combined rotational and translational movement of the flap, such as fowler flap mountings including, e.g., a four-bar linkage or a carriage-track mechanism.

According to a further embodiment, the actuator unit may comprise a motor, such as a single motor, a first output and a second output. The motor might be an electric motor, a hydraulic motor, or a pneumatic motor. The motor is configured for driving both the first output and the second output in a manner independent from one another. The actuation unit may comprise only one motor for driving the first output and the second output. However, in some embodiments an additional back-up motor might be provided for redundancy reasons, that is also capable of driving the first output and the second output in defined situations. By such a motor driving first and second outputs, independent movement of the trailing edge part relative to the leading edge part and the flap relative to the main wing by a single motor is enabled.

In particular, the first output may be formed as a first output shaft rotatable about a first shaft axis. Additionally or alternatively, the second output is formed as a second output shaft rotatable about a second shaft axis. Such rotatable output shafts represent a very efficient and compact output concept. However, the first output and/or the second output might also be formed as a linear output, in particular a linearly movable output rod or a ball-screw.

A first rotating arm may be mounted to the first output shaft, such as fixedly mounted to the first output shaft, or mounted to the first output shaft by its one end, and/or mounted to the first output shaft in a way extending transverse to the first shaft axis. Additionally or alternatively, a second rotating arm is mounted to the second output shaft, such as fixedly mounted to the second output shaft, and/or mounted to the second output shaft by its one end, and/or mounted to the second output shaft in a way extending transverse to the second shaft axis. Such first and second rotating arms are compact and efficient drive members.

The first rotating arm may be coupled to the trailing edge part of the flap such as via a first linkage comprising at least one first link. The first link may be rotatably mounted to the first rotating arm and is rotatably mounted to the trailing edge part, such as to the lower side of the trailing edge part or to a lever mounted to the trailing edge part, to the lower side of the trailing edge part. By such a first linkage a simple and efficient coupling can be realized between the first rotating arm and the trailing edge part of the flap.

According to an embodiment, the actuator unit is mounted to the main wing, such as fixedly mounted to the main wing, or mounted to a rib extending downwards from a lower side of the main wing. In such a way, the actuator unit can be reliably mounted and does not need to be mounted to a moving part.

In particular, the second rotating arm may be coupled to the leading edge part of the flap or to a flap lever arm such as by being fixedly mounted to the leading edge part of the flap and extending downwards from the lower side of the leading edge part, via a second linkage comprising at least one second link. The second link may be rotatably mounted to the second rotating arm and is rotatably mounted to the leading edge part, such as to the lower side of the leading edge part or to a flap lever arm mounted to the lower side of the leading edge part. In such a way, an efficient and reliable linkage is formed.

According to an alternative embodiment, the actuator unit is mounted to the leading edge part of the flap such as fixedly mounted to the leading edge part of the flap, to a flap lever arm extending downwards from a lower side of the leading edge part, and/or mounted to the lower side of the leading edge part of the flap. In such a way, movement of the flap relative to the main wing and movement of the trailing edge part relative to the leading edge part are fully decoupled from one another, in particular the flap can be moved relative to the main wing without influencing movement of the trailing edge part relative to the leading edge part.

In particular, the second rotating arm may be coupled to the main wing, such as to a rib extending downwards from a lower side of the main wing, via a second linkage comprising at least one second link. The second link may be rotatably mounted to the second rotating arm and rotatably mounted to the main wing, such as to the lower side of the main wing or to a rib mounted to the main wing, or to the lower side of the main wing. In such a way, an efficient and reliable linkage is formed.

According to an embodiment, the first output shaft and the second output shaft are arranged in a manner extending from opposite sides of the motor or extending from one common side of the motor in a manner coaxial or parallelly spaced from one another. These are all very compact and efficient positions of the first and second output shafts.

According to another embodiment, the first output shaft and the second output shaft are coupled to the motor via a differential gear unit such as configured to control how the rotational power provided by the motor is distributed between the first and second output shafts. Such a differential gear unit represents a very simple and reliable means to control the transmission of rotational power from the motor to any of the first or second output shafts.

In particular, the differential gear unit may comprise a differential gear coupled to the motor, a first selection brake coupled between the differential gear and the first output shaft, and a second selection brake coupled between the differential gear and the second output shaft. The differential gear unit may further comprise a first gear unit, such as a reduction gear unit, coupled between the first selection brake and the first output shaft and/or a second gear unit, such as a reduction gear unit, coupled between the second selection brake and the second output shaft. By selective application of the first and second selective brakes it can be controlled which of the first and second output shafts is provided with rotational power from the motor. Specifically, the actuator unit can be selectively operated in a first operation mode and in a second operation mode. In the first operation mode, the first selection brake is engaged and the second selection brake is released, so that the second output shaft is driven by the motor and the first output shaft is still. In the second operation mode, the second selection brake is engaged and the first selection brake is released, so that the first output shaft is driven by the motor and the second output shaft is still. In such a way, a very simple and efficient differential gear unit is formed.

A further aspect of the present invention relates to a trailing edge high lift assembly for the wing and/or as used in the wing according to any of the embodiments explained above. In particular, the trailing edge high lift assembly comprises a flap and a connection assembly for movably mounting the flap to the main wing, such that the flap is movable between a retracted position and at least one extended position. The connection assembly comprises an actuator unit for moving the flap between the retracted position and the at least one extended position. The flap comprises a leading edge part and a trailing edge part mounted to the leading edge part in a manner pivotable about a pivot axis. The actuator unit is configured for moving the trailing edge part relative to the leading edge part in a way independent from moving the flap relative to the main wing between the retracted position and the at least one extended position.

Additionally or alternatively, the actuator unit is configured for moving the flap relative to the main wing between the retracted position and the at least one extended position in a way independent from moving the trailing edge part relative to the leading edge part. The features and effects explained above in connection with the wing apply vis-à-vis also to the trailing edge high lift assembly.

A further aspect of the present invention relates to an aircraft comprising the wing according to any of the embodiments explained above, and/or comprising the trailing edge high lift assembly according to any of the embodiments explained above. The features and effects explained above in connection with the wing and the trailing edge high lift assembly apply vis-à-vis also to the aircraft.

Hereinafter, embodiments of the present invention are described in more detail by means of a drawing. The drawing shows in

SUMMARY OF DRAWINGS

FIG. 4 is a schematic top view of a first embodiment of an actuator unit to be used in the wing according to the invention, FIG. 5 is a schematic top view of a second embodiment of an actuator unit to be used in the wing according to the invention, FIG. 6 is a schematic top view of a third embodiment of an actuator unit to be used in the wing according to the invention, FIG. 7 is a function diagram of the actuator unit of the wing according to the invention, in a first operation mode, and FIG. 8 is a function diagram of the actuator unit of the wing according to the invention, in a second operation mode.

DETAILED DESCRIPTION

Figure 1:
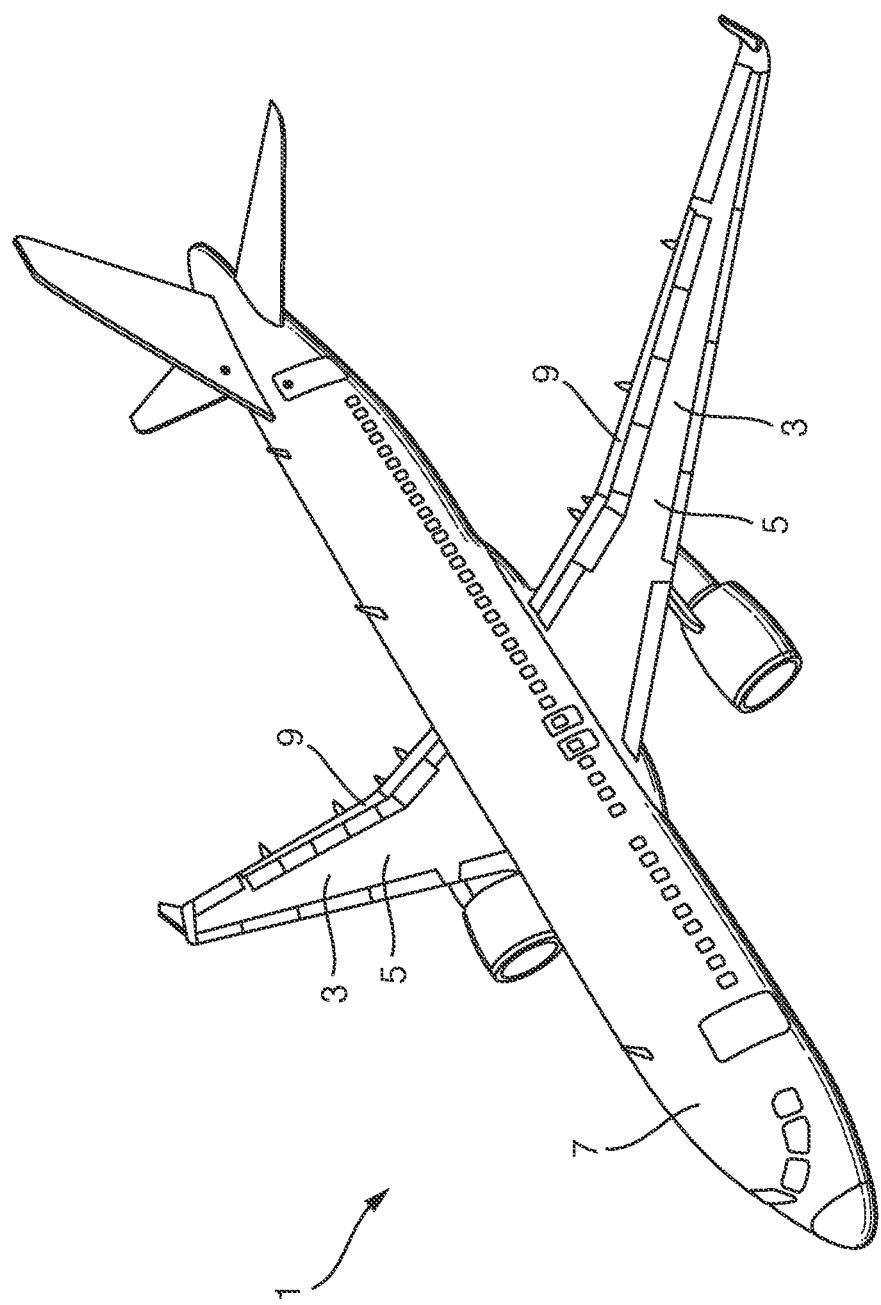
FIG. 1 is a perspective view of an aircraft according to an embodiment of the invention.

FIG. 1 shows an exemplary aircraft 1 according to an embodiment of the present invention. The aircraft 1 comprises a wing 3 including a main wing 5 mounted to a fuselage 7, and a trailing edge high lift assembly 9 including a flap 11 movably mounted to the main wing 5.

Figure 2:
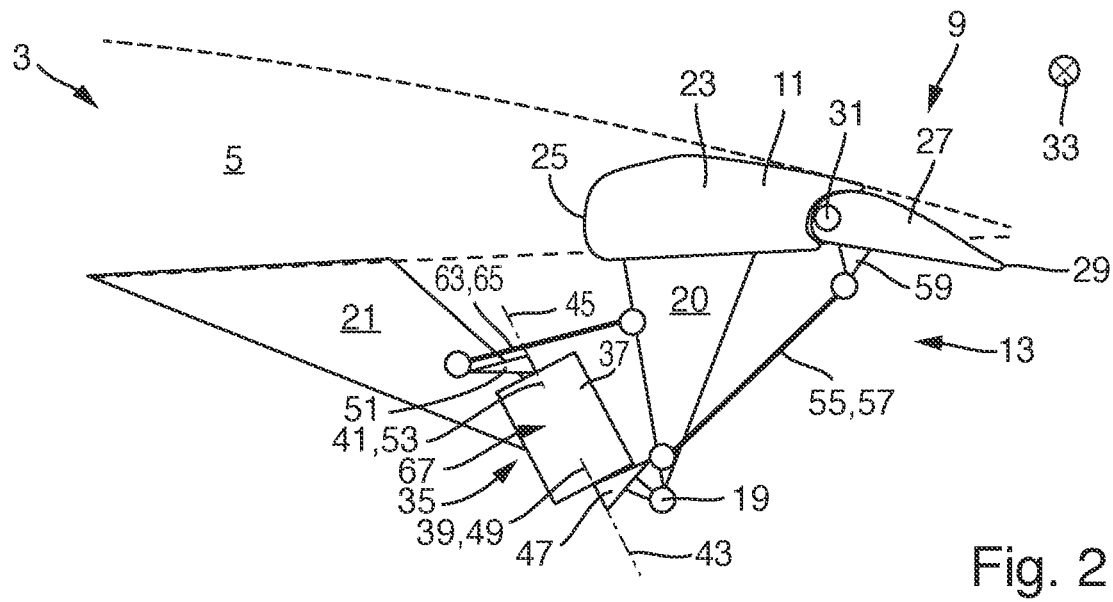
FIG. 2 is a schematic cross sectional view across the span direction of a wing according to a first embodiment of the invention with a focus on the trailing edge high lift assembly including the flap.
Figure 3:
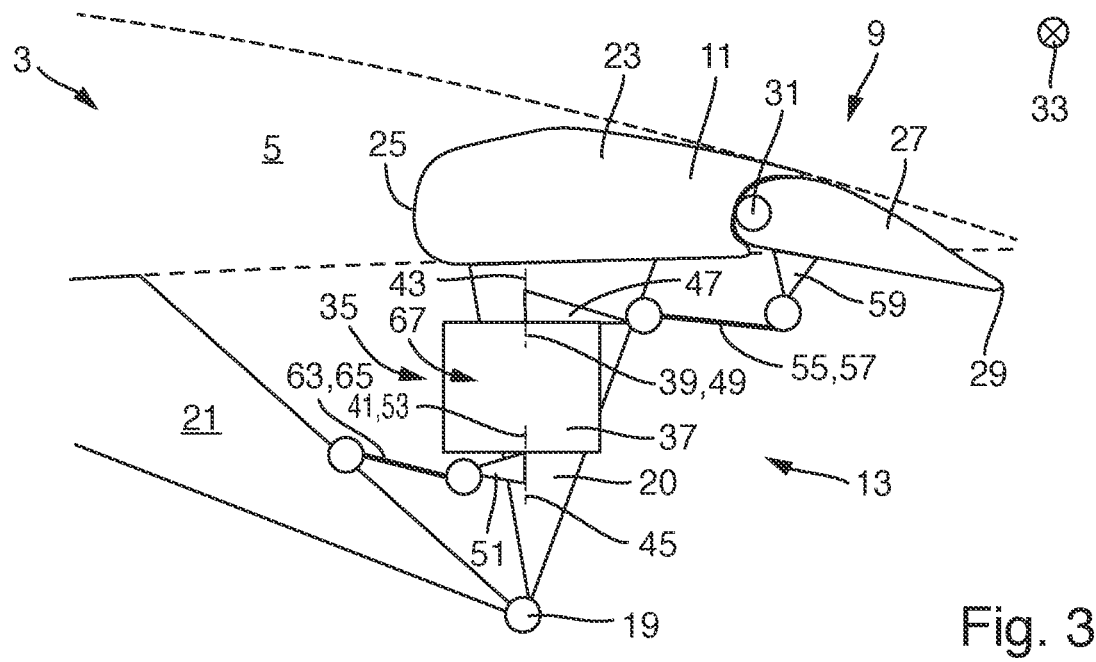
FIG. 3 is a schematic cross sectional view across the span direction of a wing according to a second embodiment of the invention with a focus on the trailing edge high lift assembly including the flap.

FIGS. 2 and 3 illustrate two embodiments of the wing 3 of the aircraft 1 shown in FIG. 1. The wing 3 according to both first and second embodiments as shown in FIGS. 2 and 3 comprises a main wing 5 and a trailing edge high lift assembly 9. The trailing edge high lift assembly 9 is movably arranged at a trailing edge of the main wing 5 and comprises a flap 11 and a connection assembly 13. The connection assembly 13 movably mounts the flap 11 to the main wing 5, such that the flap 11 is movable between a retracted position with a reduced chord length and curvature of the wing 3, and at least one extended position with an extended chord length and curvature of the wing 3. The flap 11 is mounted to the main wing 5 in a manner rotatable about a flap rotation axis 19, wherein the flap rotation axis 19 is located outside the flap profile spaced apart from the flap 11 by a flap lever arm 20. The flap lever arm 20 is mounted to the main wing 5 via a rib 21 that projects downwards from the lower side of the main wing 5 and that is mounted to the lever arm 20 rotatably via the flap rotation axis 19. The flap 11 comprises a leading edge part 23 including the leading edge 25 of the flap 11, and a trailing edge part 27 including the trailing edge 29 of the flap 11 and mounted to the leading edge part 23 in a manner pivotable about a pivot axis 31 extending in a span direction 33.

The connection assembly 13 comprises an actuator unit 35 for moving the flap 11 relative to the main wing 5 between the retracted position and the at least one extended position, and for moving the trailing edge part 27 relative to the leading edge part 23. Specifically, the actuator unit 35 is configured for moving the trailing edge part 27 relative to the leading edge part 23 in a way independent from moving the flap 11 relative to the main wing 5 between the retracted position and the at least one extended position. Additionally or alternatively, the actuator unit 35 is configured for moving the flap 11 relative to the main wing 5 between the retracted position and the at least one extended position in a way independent from moving the trailing edge part 27 relative to the leading edge part 23. Specifically, the actuator unit 35 is configured for driving the trailing edge part 27 relative to the leading edge part 23 and the flap 11 relative to the main wing 5 in a way independently from one another.

In the embodiments shown in FIGS. 2 and 3, the actuator unit 35 comprises a motor 37, a first output 39 and a second output 41. The motor 37 in the present embodiment is an electric motor but might also be e.g. a hydraulic motor or a pneumatic motor. The motor 37 is configured for driving both the first output 39 and the second output 41 in a manner independent from one another. The first output 39 is formed as a first output shaft 49 rotatable about a first shaft axis 43. The second output 41 is formed as a second output shaft 53 rotatable about a second shaft axis 45. A first rotating arm 47 is fixedly mounted to the first output shaft 49 by its one end in a way extending transverse to the first shaft axis 43. A second rotating arm 51 is fixedly mounted to the second output shaft 53 by its one end in a way extending transverse to the second shaft axis 45. The first rotating arm 47 is coupled by its opposite end to the trailing edge part 27 of the flap 11 via a first linkage 55 comprising a first link 57. The first link 57 is rotatably mounted to the first rotating arm 47 and in a spaced position is rotatably mounted to a lever 59 mounted to a lower side of the trailing edge part 27.

In the embodiment shown in FIG. 2, the actuator unit 35 is fixedly mounted to a rib 21 of the main wing 5 extending downwards from a lower side of the main wing 5. The second rotating arm 51 is coupled by its opposite end to a flap lever arm 20 fixedly mounted to the leading edge part 23 of the flap 11 and extending downwards from the lower side of the leading edge part 23, via a second linkage 63 comprising a second link 65. The second link 65 is rotatably mounted to the second rotating arm 51 and is rotatably mounted to the flap lever arm 20 mounted to the lower side of the leading edge part 23.

In the alternative embodiment shown in FIG. 3, the actuator unit 35 is fixedly mounted to a flap lever arm 20 extending downwards from a lower side of the leading edge part 23 of the flap 11. The second rotating arm 51 is coupled to a rib 21 extending downwards from a lower side of the main wing 5 via a second linkage 63 comprising a second link 65. The second link 65 is rotatably mounted to the second rotating arm 51 and is rotatably mounted to a rib 21 mounted to the lower side of the main wing 5.

In FIGS. 4 to 6 three alternative embodiments of the actuator unit 35 of the wings 3 shown in FIGS. 2 and 3 are shown having three different arrangements of the first and second output shafts 49, 53. In the embodiment shown in FIG. 4, the first output shaft 49 and the second output shaft 53 are arranged in a manner extending away from the motor 37 on opposite sides of the motor 37. In the embodiment shown in FIG. 5, the first output shaft 49 and the second output shaft 53 are arranged in a manner extending away from the motor 37 on one common side of the motor 37 in a coaxial way. In the embodiment shown in FIG. 6, the first output shaft 49 and the second output shaft 53 are arranged in a manner extending away from the motor 37 on one common side of the motor 37 in a way parallelly spaced from one another.

As shown in FIGS. 7 and 8, the first output shaft 49 and the second output shaft 53 of the wings 3 shown in FIGS. 2 and 3 are coupled to the motor 37 via a differential gear unit 67 configured to control how the rotational power provided by the motor 37 is distributed between the first and second output shafts 49, 53. The differential gear unit 67 comprises a differential gear 69 coupled to the motor 37, a first selection brake 71 coupled between the differential gear 69 and the first output shaft 49, and a second selection brake 73 coupled between the differential gear 69 and the second output shaft 53. The differential gear unit 67 further comprises a first gear unit 75 in the form of a reduction gear unit coupled between the first selection brake 71 and the first output shaft 49 and a second reduction gear unit 77 in the form of a reduction gear unit coupled between the second selection brake 73 and the second output shaft 53. By selective application of the first and second selection brakes 71, 73 it can be controlled which of the first and second output shafts 49, 53 is provided with rotational power from the motor 37. Specifically, the actuator unit 35 can be selectively operated in a first operation mode and in a second operation mode. In the first operation mode shown in FIG. 7, the first selection brake 71 is engaged and the second selection brake 73 is released, so that the second output shaft 53 is driven by the motor 37 and the first output shaft 49 is still. In the second operation mode shown in FIG. 8, the second selection brake 73 is engaged and the first selection brake 71 is released, so that the first output shaft 49 is driven by the motor 37 and the second output shaft 53 is still.

By the trailing edge high lift assembly 9 according to the invention, only one actuator unit 35 is required to move both the flap 11 relative to the main wing 5 and the trailing edge part 27 relative to the leading edge part 23 of the flap 11 in an independent manner, thereby largely reducing complexity, weight and costs of the wing 3.

In summary, the wing (3) includes a main wing (5) and a trailing edge high lift assembly (9) movably arranged at a trailing edge of the main wing (5), the trailing edge high lift assembly (9) comprising a flap (11) and a connection assembly (13) movably mounting the flap (11) to the main wing (5), wherein the connection assembly (13) comprises an actuator unit (35) for moving the flap (11) between a retracted position and at least one extended position, wherein the flap (11) comprises a leading edge part (23) and a trailing edge part (27) mounted to the leading edge part (23) in a manner pivotable about a pivot axis (31). The object to provide a wing having a simplified trailing edge high lift assembly that allows to reduce weight and costs of the wing, is achieved in that the actuator unit (35) is configured for moving the trailing edge part (27) relative to the leading edge part (23) in a way independent from moving the flap (11) between the retracted position and the at least one extended position, and/or in that the actuator unit (35) is configured for moving the flap (11) between the retracted position and the at least one extended position in a way independent from moving the trailing edge part (27) relative to the leading edge part (23)

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft comprising
a main wing,
a trailing edge high lift assembly movably arranged at a trailing edge of the main wing, the trailing edge high lift assembly comprising
a flap, and
a connection assembly movably mounting the flap to the main wing such that the flap is movable between a retracted position and at least one extended position,
wherein the connection assembly comprises an actuator unit configured to move the flap between the retracted position and the at least one extended position,
wherein the flap comprises a leading edge part and a trailing edge part mounted to the leading edge part in a manner pivotable about a pivot axis,
wherein the actuator unit is mounted to the leading edge part of the flap, to a flap lever arm mounted to the leading edge part of the flap or to the main wing,
wherein the actuator unit comprises a motor configured to drive a first output of the actuator and drive a second output of the actuator independently to the driving of the first output,
wherein the actuator unit is configured to move, using the first output, the trailing edge part relative to the leading edge part independently of moving, using the second output, the flap between the retracted position and the at least one extended position, and
wherein the actuator unit is configured to move the flap, using the second output, between the retracted position and the at least one extended position independently of the moving, using the first output, of the trailing edge part relative to the leading edge part.

2. The wing according to claim 1, wherein the connection assembly is configured such that the flap is rotatable relative to the main wing.

3. The wing according to claim 1, wherein the first output is a first output shaft rotatable about a first shaft axis, and/or the second output is a second output shaft rotatable about a second shaft axis.

4. The wing according to claim 3, wherein a first rotating arm is mounted to the first output shaft, and/or
wherein a second rotating arm is mounted to the second output shaft.

5. The wing according to claim 4, wherein the first rotating arm is coupled to the trailing edge part of the flap via a first linkage comprising at least one first link.

6. The wing according to claim 1, wherein the actuator unit is mounted to the main wing.

7. The wing according to claim 6, further comprising a second rotating arm coupled, via a second linkage, to the leading edge part of the flap or to a flap lever arm mounted to the leading edge part of the flap, wherein the second linkage comprises at least one second link.

8. The wing according to claim 7, wherein the second rotating arm is coupled to the main wing via a second linkage comprising at least one second link.

9. The wing according to claim 3, wherein the first output shaft and the second output shaft are arranged in a manner extending from opposite sides of the motor or extending from one common side of the motor in a manner coaxial or parallelly spaced from one another.

10. The wing according to claim 3, wherein the first output shaft and the second output shaft are coupled to the motor via a differential gear unit.

11. The wing according to claim 10, wherein the differential gear unit comprises:

a differential gear coupled to the motor, a first selection brake coupled between the differential gear and the first output shaft, and a second selection brake coupled to the differential gear and the second output shaft.

12. An aircraft comprising the wing according to claim 1.

13. A trailing edge high lift assembly comprising:

a flap comprising a leading edge part and a trailing edge part pivotably mounted to the leading edge part such that the trailing edge part pivots about a pivot axis, and a connection assembly configured to moveably mount the flap to a main wing such that the flap is movable between a retracted position and at least one extended position, wherein the connection assembly comprises an actuator unit configured to move the flap between the retracted position and the at least one extended position, wherein the actuator unit is mounted to the leading edge part of the flap, to a flap lever arm mounted to the leading edge part of the flap or to the main wing, wherein the actuator unit comprises a motor configured to drive a first output of the actuator and drive a second output of the actuator independently to the driving of the first output, wherein the actuator unit is configured to pivot, using the first output, the trailing edge part relative to the leading edge part independently of the movement of the flap, using the second output, between the retracted position and the at least one extended position, and wherein the actuator unit is configured to move the flap, using the second output, between the retracted position and the at least one extended position independently of the pivoting, using the first output, of the trailing edge part relative to the leading edge part.

14. A wing for an aircraft comprising a main wing, a flap positioned proximate a trailing edge of the main wing, wherein the flap comprises a leading edge part and a trailing edge part pivotably mounted to the leading edge part, and a connection assembly attached to the main wing and the flap, wherein the connection assembly is configured to move the flap between a retracted position relative to the main wing and at least one extended position relative to the main wing, wherein the connection assembly comprises:

an actuator unit mounted to the main wing or flap and configured to move the flap between the retracted position and the at least one extended position and pivot the trailing edge part relative to the leading edge part independently of moving the flap between the retracted position and the at least one extended position, one motor included in the actuator unit, wherein the motor drives a first output and a second output, wherein the second output and first output are driven independently by the motor;

a first linkage connected to the motor and to the trailing edge part of the flap, wherein first output moves the first linkage to pivot the trailing edge part about the leading edge part of the flap, and a second linkage connected to the motor and to the leading edge part of the flap or to the main wing, wherein the second output moves the second linkage to move the flap between the retracted position and the at least one extended position.

15. The wing of claim 14, further comprising:

a main wing rib having a rib upper portion fixed to an underside of the main wing and a rib lower portion below the flap while the flap is in the retracted position; and a lever arm having an arm upper portion fixed to an underside of the leading edge part of the flap and an arm lower portion pivotably attached to the rib lower portion, wherein the flap pivots about the rib lower portion as the flap moves between the retracted position and the at least one extended position.

16. The wing of claim 14, wherein the first linkage includes a first arm and a first link attached to the first arm and to the trailing edge part of the flap, wherein the first arm is turned by the first output of the motor to move the first link to pivot the trailing edge part relative to the leading edge part of the flap, and wherein the second linkage includes a second arm and a second link attached to the second arm and to the leading edge part of the flap or to the main wing, wherein the second arm is turned by the second output of the motor to move the second link to move the flap between the retracted position and the at least one extended position.

17. The wing of claim 16, wherein the first arm and the second arm turns about a common axis.

\* \* \* \* \*